United States Patent
Lewandowski et al.

(10) Patent No.: US 7,041,755 B2
(45) Date of Patent: May 9, 2006

(54) RING-OPENED AZLACTONE PHOTOINIFERTERS FOR RADICAL POLYMERIZATION

(75) Inventors: Kevin M. Lewandowski, Inver Grove Heights, MN (US); Michael S. Wendland, North Saint Paul, MN (US); Duane D. Fansler, Dresser, WI (US); Steven M. Heilmann, Afton, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/081,197

(22) Filed: Mar. 16, 2005

(65) Prior Publication Data

US 2005/0182209 A1    Aug. 18, 2005

Related U.S. Application Data

(62) Division of application No. 10/393,551, filed on Mar. 21, 2003, now Pat. No. 6,908,952.

(51) Int. Cl.
 C08F 2/46 (2006.01)
 C08F 4/00 (2006.01)
 C08F 20/00 (2006.01)
 C08F 12/00 (2006.01)

(52) U.S. Cl. .................... 526/146; 522/57; 522/65; 522/904; 522/114; 526/147; 526/217; 526/222; 525/308; 525/314

(58) Field of Classification Search ............. 522/57, 522/65, 904, 114; 526/146, 147, 217, 222; 525/308, 314
See application file for complete search history.

(56) References Cited

U.S. PATENT DOCUMENTS

| | | | | |
|---|---|---|---|---|
| 4,304,705 A | * | 12/1981 | Heilmann et al. | 525/279 |
| 5,097,007 A | * | 3/1992 | Himori | 528/274 |
| 5,314,962 A | * | 5/1994 | Otsu et al. | 525/280 |
| 5,356,947 A | * | 10/1994 | Ali et al. | 522/57 |
| 6,677,413 B1 | | 1/2004 | Lewandowski et al. | |
| 6,680,362 B1 | | 1/2004 | Fansler et al. | |
| 6,747,104 B1 | | 6/2004 | Wendland et al. | |
| 6,753,391 B1 | | 6/2004 | Lewandowski et al. | |
| 6,762,257 B1 | | 7/2004 | Lewandowski et al. | |
| 6,784,264 B1 | | 8/2004 | Lewandowski et al. | |
| 6,784,265 B1 | | 8/2004 | Fansler et al. | |
| 6,818,716 B1 | | 11/2004 | Wendland et al. | |
| 6,841,637 B1 | | 1/2005 | Lewandowski et al. | |
| 6,894,133 B1 | | 5/2005 | Lewandowski et al. | |
| 6,908,952 B1 | | 6/2005 | Lewandowski et al. | |
| 6,911,510 B1 | | 6/2005 | Lewandowski et al. | |
| 2004/0116633 A1 | | 6/2004 | Fansler et al. | |
| 2004/0152852 A1 | * | 8/2004 | Lewandowski et al. | 526/204 |
| 2004/0152853 A1 | * | 8/2004 | Fansler et al. | 526/220 |
| 2004/0198933 A1 | * | 10/2004 | Wendland et al. | 526/146 |
| 2004/0225090 A1 | * | 11/2004 | Lewandowski et al. | 526/135 |
| 2004/0225091 A1 | * | 11/2004 | Lewandowski et al. | 526/146 |
| 2005/0065300 A1 | | 3/2005 | Lewandowski et al. | |
| 2005/0159569 A1 | | 7/2005 | Fansler et al. | |

FOREIGN PATENT DOCUMENTS

| | | |
|---|---|---|
| WO | WO 2004/052943 A1 | 6/2004 |
| WO | WO 2004/052944 A1 | 6/2004 |
| WO | WO 2004/072127 A1 | 8/2004 |
| WO | WO 2004/072139 A1 | 8/2004 |
| WO | WO 2004/094484 A1 | 11/2004 |
| WO | WO 2004/094485 A1 | 11/2004 |
| WO | WO 2004/099275 A1 | 11/2004 |
| WO | WO 2004/099276 A1 | 11/2004 |

\* cited by examiner

Primary Examiner—Susan Berman
(74) Attorney, Agent, or Firm—Kent S. Kokko

(57) ABSTRACT

Photoiniferters for controlled radical polymerizations are described. The photoiniferters have an azlactone or ring-opened azlactone moiety to provide telechelic (co)polymers.

6 Claims, No Drawings

RING-OPENED AZLACTONE PHOTOINIFERTERS FOR RADICAL POLYMERIZATION

This application is a divisional of U.S. Ser. No. 10/393,551, filed Mar. 21, 2003 now U.S. Pat. No. 6,908,952, now allowed, the disclosure of which is herein incorporated by reference.

FIELD OF THE INVENTION

The present invention provides photoiniferters for radical polymerization processes and telechelic polymers made thereby.

BACKGROUND

In conventional radical polymerization processes, the polymerization terminates when reactive intermediates are destroyed or rendered inactive; radical generation is essentially irreversible. It is difficult to control the molecular weight and the polydispersity (molecular weight distribution) of polymers produced by conventional radical polymerization, and difficult to achieve a highly uniform and well-defined product. It is also often difficult to control radical polymerization processes with the degree of certainty necessary in specialized applications, such as in the preparation of end functional polymers, block copolymers, star (co)polymers, and other novel topologies.

In a controlled radical polymerization process radicals are generated reversibly, and irreversible chain transfer and chain termination are absent. There are four major controlled radical polymerization methodologies: atom transfer radical polymerization (ATRP), reversible addition-fragmentation chain transfer (RAFT), nitroxide-mediated polymerization (NMP) and iniferters, each method having advantages and disadvantages.

The term "iniferter", or "photoiniferter" as it is also known, refers to a chemical compound that has a combined function of being a free radical initiator, transfer agent, and terminator, the term "iniferter" being a word formed by the underlined portions of the terms identifying these functions. The photo portion of the term indicates that the polymerization is photolytically induced. This term and its use in the production of block copolymers is well known, particularly because of the work of Takayuki Otsu of the Department of Applied Chemistry, Osaka City University, Osaka, Japan. This work is discussed, for example, in an article by Otsu et al entitled "Living Radical Polymerizations in Homogeneous Solution by Using Organic Sulfides as Photoiniferters", Polymer Bulletin, 7, 45–50 (1982), an article by Otsu et al entitled "Living Mono-and Biradical Polymerizations in Homogeneous System Synthesis of AB and ABA Type Block Copolymers", Polymer Bulletin, 11, 135–142 (1984), Otsu entitled "Iniferter Concept and Living Radical Polymerization", J. Polymer Science, Pat A, vol. 38, 2121–2136 (2000), and in European Patent Application No. 88303058.7, Publication No. 0 286 376, publication date Oct. 12, 1988.

There is a need for a radical polymerization process which provides (co)polymers having a predictable molecular weight and a narrow molecular weight distribution (low "polydispersity"). A further need is strongly felt for a radical polymerization process which is sufficiently flexible to provide a wide variety of products, but which can be controlled to the degree necessary to provide highly uniform products with a controlled structure (i.e., controllable topology, composition, stereoregularity, etc.). There is further need for a controlled radical polymerization process which provides telechelic (co)polymers capable of entering into further polymerization or functionalization through reactive end-groups, particularly electrophilic end groups.

SUMMARY OF THE INVENTION

The present invention provides photoiniferters for controlled radical polymerization processes that comprise compounds of the formula:

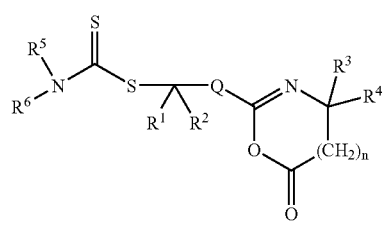

I wherein
$R^1$ and $R^2$ are each independently selected from H, an alkyl group, a nitrile group, a cycloalkyl group, a heterocyclic group, an arenyl group and an aryl group, or $R^1$ and $R^2$ taken together with the carbon to which they are attached form a carbocyclic ring;
$R^3$ and $R^4$ are each independently selected from an alkyl group, a cycloalkyl group, an aryl group, an arenyl group, or $R^3$ and $R^4$ taken together with the carbon to which they are attached form a carbocyclic ring;
$R^5$ and $R^6$ are each independently selected from an alkyl group, a cycloalkyl group, an aryl group, an arenyl group, or $R^5$ and $R^6$ taken together with the nitrogen to which they are attached form a heterocyclic ring, $R^5$ and $R^6$ are optionally substituted with phosphate, phosphonate, sulfonate, ester, halogen, nitrile, amide, and hydroxy groups; $R^5$ and $R^6$ may optionally be substituted with one or more caternary heteroatoms, such as oxygen, nitrogen or sulfur;
Q is a linking group selected from a covalent bond, an arenyl group, an aryl group (—CH$_2$—)$_o$, —CO—O—(CH$_2$)$_o$—, —CO—O—(CH$_2$CH$_2$O)$_o$—, —CO—NR$^8$—(CH$_2$)$_o$—, —CO—S—(CH$_2$)$_o$—, where 0 is 1 to 12, and $R^8$ is H, an alkyl group, a cycloalkyl group, an arenyl group or an aryl group; and
n is 0 or 1.

The present invention also provides photoiniferters that comprise the ring-opened reaction product of the photoiniferters of Formula I and a reactive compound, such as an aliphatic compound, having one or more nucleophilic groups. Such photoiniferters have the general formula:

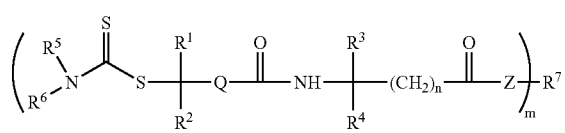

II wherein
$R^1$ and $R^2$ are each independently selected from H, a nitrile group, an alkyl group, a cycloalkyl group, an arenyl group, a heterocyclic group and an aryl group or $R^1$ and $R^2$ taken together with the carbon to which they are attached form a carbocyclic ring;

$R^3$ and $R^4$ are each independently selected from an alkyl group, a cycloalkyl group, an aryl, an arenyl group, or $R^3$ and $R^4$ taken together with the carbon to which they are attached form a carbocyclic ring;

$R^5$ and $R^6$ are each independently selected from an alkyl group, a cycloalkyl group, an aryl group, an arenyl group, or $R^5$ and $R^6$ taken together with the nitrogen to which they are attached form a heterocyclic ring, $R^5$ and $R^6$ are optionally substituted with phosphate, phosphonate, sulfonate, ester, halogen, nitrile, amide, and hydroxy groups; $R^5$ and $R^6$ may optionally be substituted with one or more caternary heteroatoms, such as oxygen, nitrogen or sulfur; n is 0 or 1;

Z is O, S or $NR^8$, wherein $R^8$ is H, an alkyl group, a cycloalkyl group, an arenyl group, a heterocyclic group or an aryl group;

$R^7$ is an organic or inorganic moiety and has a valency of m, $R^7$ is the residue of a mono- or polyfunctional compound of the formula $R^7(ZH)_m$;

Q is a linking group selected from a covalent bond, an aryl group, an arenyl group, $(-CH_2-)_o$, $-CO-O-(CH_2)_o-$, $-CO-O-(CH_2CH_2O)_o-$, $-CO-NR^8-(CH_2)_o-$, $-CO-S-(CH_2)_o-$, where o is 1 to 12, and $R^8$ is H, an alkyl group, a cycloalkyl group, an aryl group, an arenyl group, a heterocyclic group or an aryl group;

m is an integer of at least 1, preferably at least 2.

The photoiniferters of the present invention provide (co)polymers having a predictable molecular weight and a narrow molecular weight distribution. Advantageously, the photoiniferters provide novel multireactive addition polymers having first and second terminal reactive groups that may be used for further functionalization. The present invention further provides a controlled radical polymerization process useful in the preparation of terminal-functionalized (telechelic) (co)polymers, block copolymers, star (co)polymers, graft copolymers, and comb copolymers. The process provides these (co)polymers with controlled topologies and compositions.

The control over molecular weight and functionality obtained in this invention allows one to synthesize numerous materials with many novel topologies for applications in coatings, surface modifications, elastomers, sealants, lubricants, pigments, personal care compositions, composites, inks, adhesives, water treatment materials, hydrogels, imaging materials, telechelic materials and the like.

In another aspect, the invention provides a method for polymerization of one or more olefinically unsaturated monomers comprising addition polymerizing one or more olefinically unsaturated monomers using the photoiniferter comprising the azlactone photoiniferters, or the ring-opened azlactone photoiniferter.

It is to be understood that the recitation of numerical ranges by endpoints includes all numbers and fractions subsumed within that range (e.g. 1 to 5 includes 1, 1.5, 2, 2.75, 3, 3.80, 4, and 5).

It is to be understood that all numbers and fractions thereof are presumed to be modified by the term "about."

It is to be understood that "a" as used herein includes both the singular and plural.

The general definitions used herein have the following meanings within the scope of the present invention.

The term "alkyl" refers to straight or branched, cyclic or acyclic hydrocarbon radicals, such as methyl, ethyl, propyl, butyl, octyl, isopropyl, tert-butyl, sec-pentyl, cyclohexyl, and the like. Alkyl groups include, for example, 1 to 18 carbon atoms, preferably 1 to 12 carbon atoms, or most preferably 1 to 6 carbon atoms.

The term "aryl" means the monovalent residue remaining after removal of one hydrogen atom from an aromatic compound which can consist of one ring, two or three fused or catenated rings having 6 to 14 carbon atoms.

The term "arenyl" means the monovalent residue remaining after removal of a hydrogen atom from the alkyl portion of a hydrocarbon containing both alkyl and aryl groups having 6 to 26 atoms, optionally substituted with one or more catenary heteroatoms.

The term "azlactone" means 2-oxazolin-5-one groups and 2-oxazolin-6-one groups of Formula I, where n is 0 and 1, respectively.

The term "heterocyclic group" or "heterocycle" means the monovalent residue remaining after removal of one hydrogen atom from an cycloaliphatic or aromatic compound having one, two or three fused rings having 5 to 12 ring atoms and 1 to 3 heteroatoms selected from S, N, and nonperoxidic O. Useful heterocycles include azlactone, pyrrole, furan, thiophene, imidazole, pyrazole, thiazole, oxazole, pyridine, piperazine, piperidine, and hydrogenated and partially hydrogenated derivatives thereof.

The term "multifunctional" means the presence of more than one of the same functional reactive group;

The term "multireactive" means the presence of two or more of two different functional reactive groups;

The term "polyfunctional" is inclusive of multireactive and multifunctional.

The term "acid catalyst" or "acid catalyzed" means catalysis by a Brønsted- or Lewis-acid species;

The term "molecular weight" means number average molecular weight ($M_n$), unless otherwise specified.

The term (co)polymer refers to homo- and copolymers.

The term (meth)acrylate refers to both methacrylate and acrylate.

DETAILED DESCRIPTION

The present invention provides novel photoiniferters of Formula I and the corresponding ring-opened photoiniferters of Formula II for controlled radical polymerization processes.

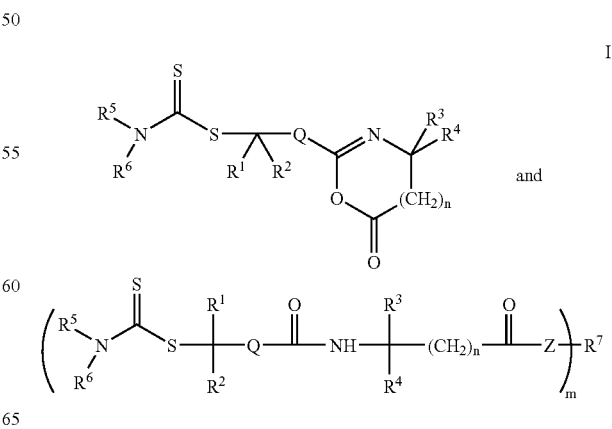

wherein $R^1$ and $R^2$ are each independently selected from H, an alkyl group of 1 to 18 carbon atoms, a nitrile, a cycloalkyl group having 3 to 14 carbon atoms, an aryl group having 6 to 14 ring atoms, an arenyl group having 6 to 26 carbon atoms, a heterocyclic group having one, two or three fused rings having 5 to 12 ring atoms and 1 to 3 heteroatoms selected from S, N, and nonperoxidic O; or $R^1$ and $R^2$ taken together with the carbon to which they are attached form a carbocyclic ring containing 4 to 12 ring atoms.

$R^3$ and $R^4$ are each independently selected from an alkyl group having 1 to 18 carbon atoms, a cycloalkyl group having 3 to 14 carbon atoms, an aryl group having 6 to 14 ring atoms, an arenyl group having 6 to 26 carbon atoms and 0 to 3 S, N, and nonperoxidic O heteroatoms, or $R^3$ and $R^4$ taken together with the carbon to which they are attached form a carbocyclic ring containing 4 to 12 ring atoms;

$R^5$ and $R^6$ are each independently selected from an alkyl group, a cycloalkyl group, an aryl group, an arenyl group, or $R^5$ and $R^6$ taken together with the nitrogen to which they are attached form a heterocyclic ring, $R^5$ and $R^6$ are optionally substituted with phosphate, phosphonate, sulfonate, ester, halogen, nitrile, amide, and hydroxy groups;

$R^5$ and $R^6$ may optionally be substituted with one or more caternary heteroatoms, such as oxygen, nitrogen or sulfur;

Z is O, NH, S or $NR^8$, wherein $R^8$ is a H, an alkyl group, a cycloalkyl group, an aryl group an arenyl group or a heterocyclic group;

$R^7$ is an organic or inorganic moiety and has a valency of m;

m is an integer of at least 1, preferably 1 to 8, most preferably at least 2;

Q is a linking group selected from a covalent bond, an aryl group, an arenyl group, $(-CH_2-)_o$, $-CO-O-(CH_2)_o-$, $-CO-O-(CH_2CH_2O)_o-$, $-CO-NR^8-(CH_2)_o-$, $-CO-S-(CH_2)_o-$, where o is 1 to 12, and $R^8$ is H, an alkyl group, a cycloalkyl group or an aryl group;

and n is 0 or 1.

Examples of olefinically unsaturated monomers that may be polymerized include (meth)acrylates such as ethyl(meth) acrylate, propyl(meth)acrylate, butyl(meth)acrylate, isooctyl(meth)acrylate and other alkyl(meth)acrylates; also functionalized (meth)acrylates including glycidyl(meth)acrylate, poly(ethyleneoxide) (meth)acrylate, trimethoxysilyl propyl (meth)acrylate, allyl(meth)acrylate, hydroxyethyl(meth) acrylate, hydroxypropyl(meth)acrylate, mono- and dialkyl aminoalkyl(meth)acrylates; mercaptoalkyl(meth)acrylates, fluoroalkyl(meth)acrylates; (meth)acrylic acid, fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides; butadienes; unsaturated alkylsulphonic acids or derivatives thereof; 2-vinyl-4, 4-dimethylazlactone, N-vinyl pyrrolidinone, and (meth)acrylamide or derivatives thereof. Mixtures of such monomers may be used. Monomers having pendent, nucleophilic functional groups such as hydroxy-, amino- or thiol-functional groups are particularly useful for providing so-called $AB_n$ polymers. Such pendent nucleophilic functional groups may react with the azlactone terminal group to provide novel architectures. Such pendent nucleophilic functional groups may be protected during the polymerization, and deprotected post-polymerization for providing novel polymer architecture.

Photoiniferters of Formula I may be prepared using the generalized sequence as shown:

Scheme I

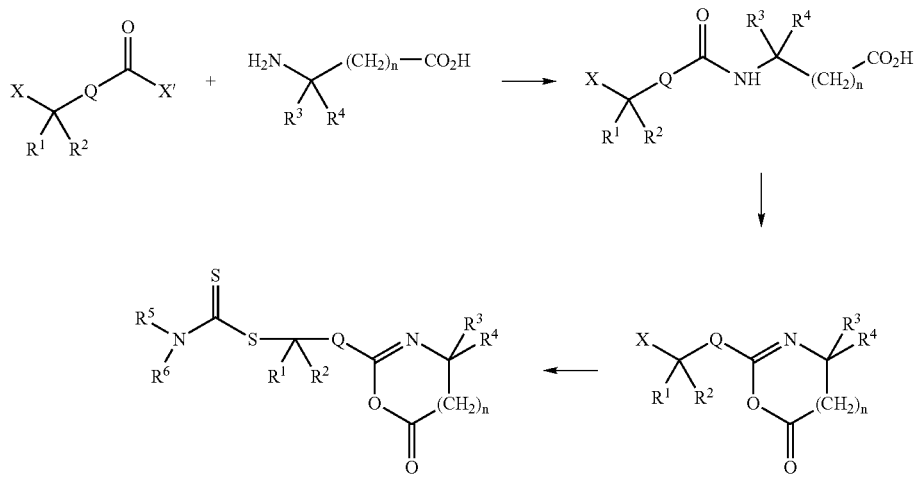

In the above Scheme I, where X and X' are halogen atoms or other suitable leaving groups, an amino acid is first acylated, generally by dissolving the amino acid in aqueous base, followed by treatment with the acyl halide compound under interfacial reaction conditions. Cyclization may be effected by treatment with acetic anhydride and pyridine, by treatment with carbodiimides, or preferably by treatment with ethyl chloroformate and a trialkylamine, which proceeds through a mixed carboxylic-carbonic anhydride. The dithiocarbamate moiety is introduced by displacement of the X group. Further details regarding the preparation of azlactones may be found in "Polyazlactones", *Encyclopedia of Polymer Science and Engineering*, vol. 11, 2$^{nd}$ Ed., John Wiley and Sons, pp. 558–571 (1988). With respect to the above reaction scheme, it will be apparent that diacyl halide starting materials may be used to produce dimeric or bis-azlactone photoiniferters. These bis-azlactone photoiniferters have the general structure:

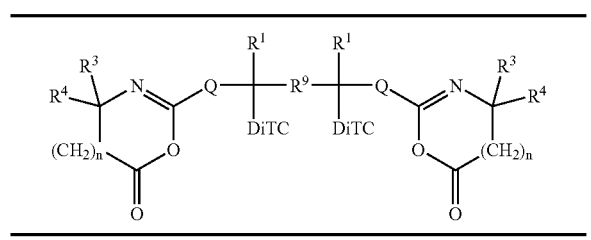

wherein

DiTC is a dithiocarbamate group of the formula $R^5R^6N-C(S)-S-$, $R^1$ is selected from H, an alkyl group of 1 to 18 carbon atoms, a cycloalkyl group having 3 to 14 carbon atoms, an aryl group having 6 to 14 ring atoms, an arenyl group having 6 to 26 carbon atoms, a heterocyclic group having one, two or three fused rings having 5 to 12 ring atoms and 1 to 3 heteroatoms selected from S, N, and nonperoxidic O;

$R^3$ and $R^4$ are each independently selected from an alkyl group having 1 to 18 carbon atoms, a cycloalkyl group having 3 to 14 carbon atoms, an aryl group having 6 to 14 ring atoms, an arenyl group having 6 to 26 carbon atoms and 0 to 3 S, N, and nonperoxidic O heteroatoms, or $R^3$ and $R^4$ taken together with the carbon to which they are attached form a carbocyclic ring containing 4 to 12 ring atoms;

$R^5$ and $R^6$ are each independently selected from an alkyl group, a cycloalkyl group, an aryl group, an arenyl group, a heterocyclic group, or $R^5$ and $R^6$ taken together with the nitrogen to which they are attached form a heterocyclic ring, $R^5$ and $R^6$ are optionally substituted with phosphate, phosphonate, sulfonate, ester, halogen, nitrile, amide, and hydroxy groups; $R^5$ and $R^6$ may optionally be substituted with one or more caternary heteroatoms, such as oxygen, nitrogen or sulfur;

$R^9$ is a divalent alkylene group of 1 to 18 carbon atoms, a cycloalkylene group having 3 to 14 carbon atoms, an aryl group having 6 to 14 ring atoms, a heterocyclic group or an arenyl group having 6 to 26 carbon atoms, Q is a linking group selected from a covalent bond, $(-CH_2-)_o$, $-CO-O-(CH_2)_o-$, $-CO-O-(CH_2CH_2O)_o-$, $-CO-NR^8-(CH_2)_o-$, $-CO-S-(CH_2)_o-$, where o is 1 to 12, and $R^8$ is H, an alkyl group, a cycloalkyl group, an arenyl group, a heterocyclic group or an aryl group; and o is 0 or 1.

Useful azlactone photoiniferters include the following compounds:

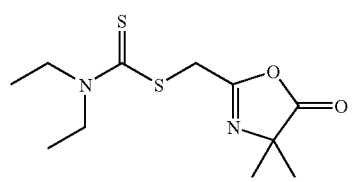

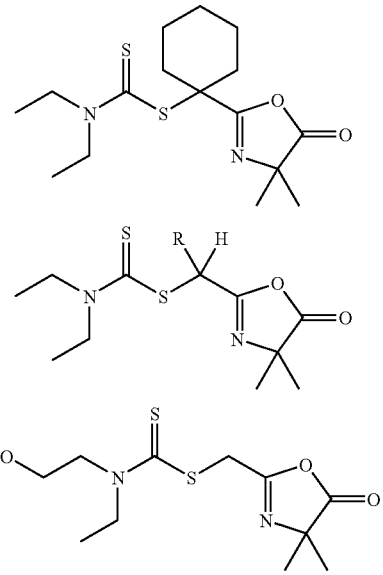

R = Me, CN or Ph

Ring-opened azlactone compounds of Formula II may be made by nucleophilic addition of a compound of the formula $R^7(ZH)_m$ to the azlactone carbonyl of Formula I as shown below. In the Scheme II, $R^7$ is an inorganic or organic group having one or a plurality of nucleophilic —ZH groups, which are capable of reacting with the azlactone moiety of Formula I. $R^7(ZH)_m$ may be water.

Scheme II

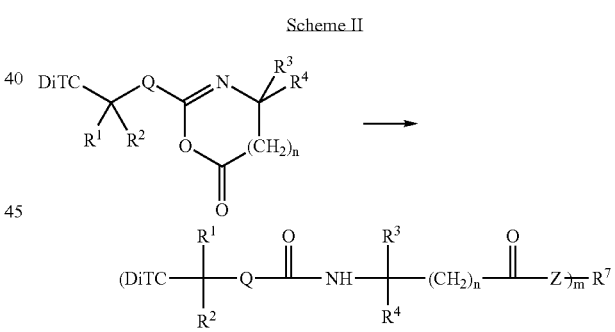

Alternatively, such ring opened compounds may be prepared by nucleophilic addition of a compound of the formula $R^7(ZH)_m$ to the halogen-containing ("X") azlactone, followed by displacement of the X group with the dithiocarbamate, as shown in Scheme III.

Scheme III

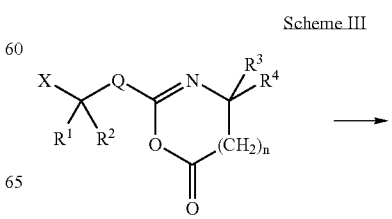

-continued

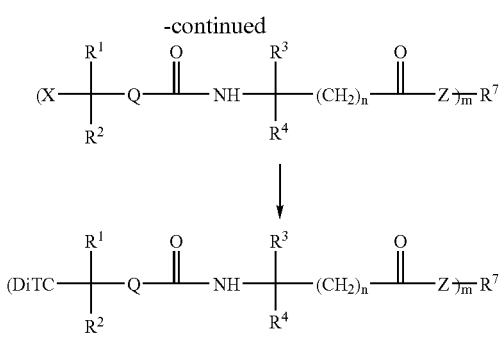

If organic, $R^7$ may be a polymeric or non-polymeric organic group that has a valence of m and is the residue of a nucleophilic group-substituted compound, $R^7(ZH)_m$, in which Z is —O—, —S—, or —NR$^8$ wherein $R^8$ can be a H, an alkyl, a cycloalkyl or aryl, a heterocyclic group, an arenyl and m is at least one, preferably at least 2. The organic moiety $R^7$ has a molecular weight up to 20,000, preferably selected from mono- and polyvalent hydrocarbyl (i.e., aliphatic and aryl compounds having 1 to 30 carbon atoms and optionally zero to four heteroatoms of oxygen, nitrogen or sulfur), polyolefin, polyoxyalkylene, polyester, polyolefin, poly(meth)acrylate, or polysiloxane backbones. If inorganic, $R^7$ may comprise silica, alumina or glass having one or a plurality of —ZH groups on the surface.

In one embodiment, $R^7$ comprises a non-polymeric aliphatic, cycloaliphatic, aromatic or alkyl-substituted aromatic moiety having from 1 to 30 carbon atoms. In another embodiment, $R^7$ comprises a polyoxyalkylene, polyester, polyolefin, poly(meth)acrylate, or polysiloxane polymer having pendent or terminal reactive —ZH groups. Useful polymers include, for example, hydroxyl, thiol or amino terminated polyethylenes or polypropylenes, hydroxyl, thiol or amino terminated poly(alkylene oxides) and poly(meth)acylates having pendant reactive functional groups, such as hydroxyethyl acrylate polymers and copolymers.

Depending on the nature of the functional group(s) of $R^7(ZH)_m$, a catalyst may be added to effect the condensation reaction. Normally, primary amine groups do not require catalysts to achieve an effective rate. Acid catalysts such as trifluoroacetic, ethanesulfonic, and toluenesulfonic acids are effective with hydroxyl groups and secondary amines.

With respect to the compound $R^7(ZH)_m$, m is at least one, but preferably m is at least two. The multiple —ZH groups of the polyfunctional compound may be the same or different. Multifunctional compounds may be reacted with the azlactone compound of Formula I to produce polyfunctional photoiniferters of Formula II, where m is at least two. Such polyfunctional photoiniferters allow the preparation of graft, branched, and star (co)polymers and other useful topologies.

Useful alcohols of the formula $R^7(ZH)_m$ include aliphatic and aromatic monoalcohols and polyols. Useful monoalcohols include methanol, ethanol, octanol, decanol, and phenol. The polyols useful in the present invention include aliphatic or aromatic polyols having at least two hydroxyl groups. Examples of useful polyols include ethylene glycol, propylene glycol, butanediol, 1,3-pentane diol, 2,2-oxydiethanol, hexanediol, poly(pentyleneadipate glycol), poly(tetramethylene ether glycol), poly(ethylene glycol), poly(caprolactone diol), poly(1,2-butylene oxide glycol), trimethylol ethane, trimethylol propane, trimethyol aminomethane, ethylene glycol, 2-butene-1, 4-diol, pentaerythritol, dipentaerythritol, and tripentaerythritol. The term "polyol" also includes derivatives of the above-described polyols such as the reaction product of the polyol with di- or poly-isocyanate, or di- or poly-carboxylic acid, the molar ratio of polyol to —NCO, or —COOH being 1 to 1.

Useful amines of the formula $R^7(ZH)_m$ include aliphatic and aromatic monoamines and polyamines. Any primary or secondary amine may be employed, although primary amines are preferred to secondary amines. Useful monoamines include, for example, methyl-, ethyl-, propyl-, hexyl-, octyl, dodecyl-, dimethyl-, methyl ethyl-, and aniline. The term "di-, or polyamine," refers to organic compounds containing at least two non-tertiary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetraoxaspiro [5,5]undecane, and polyoxyethylenediamine. Many di- and polyamines, such as those just named, are available commercially, for example, those available from Huntsman Chemical, Houston, Tex. The most preferred di- or polyamines include aliphatic diamines or aliphatic di- or polyamines and more specifically compounds with two primary amino groups, such as ethylene diamine, hexamethylene diamine, dodecanediamine, and the like.

Useful thiols of the formula $R^7(ZH)_m$ include aliphatic and aromatic monothiols and polythiols Useful alkyl thiols include methyl, ethyl and butyl thiol, as well as 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, 2-chloroethanethiol, 2-amino-3-mercaptopropionic acid, dodecyl mercaptan, thiophenol, 2-mercaptoethyl ether, and pentaerythritol tetrathioglycolate. Useful soluble, high molecular weight thiols include polyethylene glycol di(2-mercaptoacetate), LP-3™ resins supplied by Morton Thiokol Inc. (Trenton, N.J.), and Permapol P3™ resins supplied by Products Research & Chemical Corp. (Glendale, Calif.) and compounds such as the adduct of 2-mercaptoethykamine and caprolactam.

The invention provides multifunctional photoiniferters of Formula II, whereby an azlactone photoiniferter of Formula I is ring-opened by a multireactive or multifunctional compound of the formula $R^7(ZH)_m$, where m is at least 2. Such multifunctional photoiniferters may be used to produce branched, star and graft (co)polymers and other topologies. It will also be apparent that such (co)polymers may also be prepared by first polymerizing a monomer using the photoiniferter of Formula I, to produce polymers having an azlactone group at one terminal end, and then subsequently reacting the polymers with a polyfunctional compound of the formula $R^7(ZH)_m$, where m is at least 2.

In another embodiment, the multifunctional photoiniferters may comprise a solid support having a plurality of photoiniferter moieties on the surface thereof. Such photoiniferter-functionalized supports have the general structure (corresponding to Formula II):

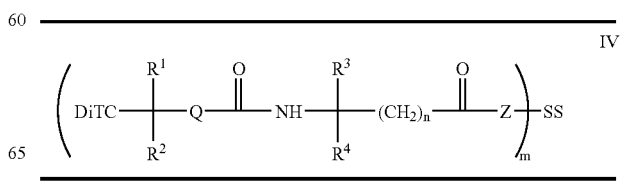

wherein DiTC, $R^1$, $R^2$, $R^3$, $R_4$, Q, Z, n and m are as previously described for Formula II and SS is a solid support corresponding to $R^7$. The solid support material includes functional groups to which photoiniferter molecules of Formula I can be covalently attached for building large or small organic compounds. Useful functional groups include hydroxyl, amino and thiol functional groups corresponding to —ZH.

The support material can be organic or inorganic. It can be in the form of solids, gels, glasses, etc. It can be in the form of a plurality of particles (e.g., beads, pellets, or microspheres), fibers, a membrane (e.g., sheet or film), a disc, a ring, a tube, or a rod, for example. Preferably, it is in the form of a plurality of particles or a membrane. It can be swellable or non-swellable and porous or nonporous.

The support material can be a polymeric material that can be used in conventional solid phase synthesis. It is chosen such that it is generally insoluble in the solvents or other components used in synthetic reactions that occur during the course of solid phase synthesis.

Examples of useable pre-existing support materials are described in G. B. Fields et al., *Int. J. Peptide Protein Res.*, 35, 161 (1990) and G. B. Fields et al., in *Synthetic Peptides: A User's Guide*, G. A. Grant, Ed., pages 77–183, W.H. Freeman and Co., New York, N.Y. (1992). The support material is in the form of an organic polymeric material, such as polystyrenes, polyalkylenes, nylons, polysulfones, polyacrylates, polycarbonates, polyesters, polyimides, polyurethanes, etc. and having hydroxyl, amino or thiol substituents on the surface. For pre-existing support materials, a preferred support material is polystyrene.

In the present polymerization, the amounts and relative proportions of photoiniferter and monomer are those effective to conduct radical polymerization. Accordingly, the amount of photoiniferter can be selected such that the photoiniferter concentration is from $10^{-5}$ M to 1 M, preferably $10^{-4}$ to $10^{-2}$ M. Alternatively, the photoiniferter can be present in a molar ratio of from $10^{-5}$:1 to $10^{-1}$:1, preferably from $10^{-5}$:1 to $2\times10^{-3}$:1, relative to monomer.

The present polymerization may be conducted in bulk, or in a solvent. Solvents, preferably organic, can be used to assist in the dissolution of the photoiniferter in the polymerizable monomers, and as a processing aid. Preferably, such solvents are not reactive with the azlactone group. Suitable solvents include ethers such as diethyl ether, ethyl propyl ether, dipropyl ether, methyl t-butyl ether, di-t-butyl ether, glyme (dimethoxyethane), diglyme, diethylene glycol dimethyl ether; cyclic ethers such as tetrahydrofuran and dioxane; alkanes; cycloalkanes; aromatic hydrocarbon solvents such as benzene, toluene, o-xylene, m-xylene, p-xylene; halogenated hydrocarbon solvents; acetonitrile; lactones such as butyrolactone, and valerolactones; ketones such as acetone, methyl ethyl ketone, methyl isobutyl ketone, cyclopentanone, and cyclohexanone; sulfones such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl)ethanol, and 2,2'-sulfonyldiethanol; sulfoxides such as dimethyl sulfoxide; cyclic carbonates such as propylene carbonate, ethylene carbonate and vinylene carbonate; carboxylic acid esters such as ethyl acetate, Methyl Cellosolve™ and methyl formate; and other solvents such as methylene chloride, nitromethane, acetonitrile, glycol sulfite and mixtures of such solvents, and supercritical solvents (such as $CO_2$). The present polymerization may be conducted in accordance with known polymerization processes.

The photoiniferter is caused to dissociate to form free radicals by exposure to an appropriate radiant energy source. The particular energy source and its intensity are selected to result in dissociation of the photoiniferter to free radicals. When employing a photoiniferter that will dissociate upon exposure to ultraviolet light radiation, an ultraviolet light source is utilized. When employing a photoiniferter that will dissociate upon exposure to visible light radiation, a visible light source is utilized. A visible light source is preferably used since it is more convenient and is considered less hazardous. The intensity and rate of radiation is chosen so that it will advance the polymerization at a reasonable rate without deleteriously affecting the polymer segment being produced. A light source having a wavelength on the order of 200 to 800 nm spaced approximately 10 cm from the reactants to provide an exposure of 1.25 milliwatts per square centimeter has been found to produce suitable results. If the energy source is ultraviolet radiation, a suitable ultraviolet light transparent vessel is utilized.

A mixture of the polymerizable monomer(s), and the photoiniferter may be irradiated with activating UV radiation. UV light sources can be of two types: 1) relatively low light intensity sources such as blacklights which provide generally 10 $mW/cm^2$ or less (as measured in accordance with procedures approved by the United States National Institute of Standards and Technology as, for example, with a UVIMA™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 $mW/cm^2$, preferably between 15 and 450 $mW/cm^2$. Where actinic radiation is used to fully or partially crosslink the polymer composition, high intensities and short exposure times are preferred. For example, an intensity of 600 $mW/cm^2$ and an exposure time of about 1 second may be used successfully. Intensities can range from about 0.1 to about 150 $mW/cm^2$, preferably from about 0.5 to about 100 $mW/cm^2$, and more preferably from about 0.5 to about 50 $mW/cm^2$.

Upon exposure to the energy source, the photoiniferter dissociates to form free radicals that promote free radical polymerization. Upon completion of the free radical polymerization of the free radically polymerizable monomer, the energy source is discontinued to permit the free radically polymerized segments to recombine with the terminator portion of the photoiniferter to form polymer segments. A second monomer charge may then be introduced if desired, which is free radically polymerizable to the block A', and the new mixture is exposed to the energy source to cause dissociation of the terminator radical and free radical polymerization of the second monomer charge onto the first polymer segment, that now being the photoiniferter of the second free radical polymerization. Upon completion of polymerization of the second monomer charge, the energy source is terminated and the terminator portion of the photoiniferter recombines with the polymer block to provide a block copolymer.

Polymerizing may be conducted at a temperature of from −78 to 200° C., preferably from 0 to 160° C. and most preferably from 0 to 30° C. The reaction should be conducted for a length of time sufficient to convert at least 1% of the monomer to polymer. Typically, the reaction time will be from several minutes to 5 days, preferably from 30 minutes to 3 days, and most preferably from 1 to 24 hours.

Polymerizing may be conducted at a pressure of from 0.1 to 100 atmospheres, preferably from 1 to 50 atmospheres and most preferably at ambient pressure (although the pressure may not be measurable directly if conducted in a sealed vessel). An inert gas such as nitrogen or argon may be used.

If desired, the polymerization may be accelerated by the addition of a metal compound to the reaction mixture. Useful accelerants include metal compounds represented by the general formula $M_yL_z$ wherein M is a cation having a valency of z of a metal which is selected from the group consisting of tin, zinc, cobalt, titanium, palladium, and lead; y is an integer of at least 1; L is an anion selected from the group consisting of $C_1$-$C_{20}$ alkyl, -aryl, —OR, —O—C(O)—R, $NO_3$—, $SO_4^{2-}$, and $PO_4^{3-}$; R is selected from the group consisting $C_{1-20}$ alkyl and aryl; and z is an integer of at least 1. Most preferably, the metal compound is selected from the group consisting of stannous 2-ethylhexanoate, zinc 2-ethylhexanoate and mixtures thereof. Reference may be made to U.S. Pat. No. 5,093,385 (Ali), incorporated herein by reference.

If desired, the polymerization reaction may benefit from the use of polymerization modifiers such as thiuram compounds, such as those disclosed in Otsu, T. et al., Journal of Polymer Science: Part A: Polymer Chemistry, 1994, Vol. 32, 2911–2918, and in Otsu, T. et al., European Polymer Journal, 1995, Vol. 31, 67–78. The addition of such thiuram compounds is particularly useful in the polymerization of acrylates and vinyl acetates using the photoiniferters of the present invention. Specifically contemplated is tetraethylthiuram disulfide.

The (co)polymers obtained by the method of the invention may be described as telechelic (co)polymers comprising polymerized units of one or more free radically (co)polymerizable monomers (as previously described), a first azlactone terminal group derived from the photoiniferter of Formula I and a second terminal group selected from the group derived from dithiocarbamate. Alternatively, when using the photoiniferters of Formula II, the first terminal group "Az" will comprise the ring-opened residue of the azlactone group of the Formula III:

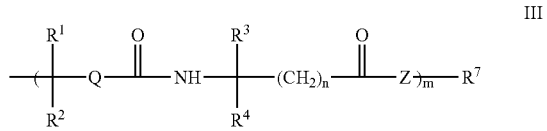

where $R^1$, $R^2$, $R^3$, $R^4$, $R^7$, Z, Q, m and n are as previously defined.

Such (co)polymers have the general formula Az-$(M^1)_x(M^2)_x(M^3)_x$ ... $(M^\Omega)_x$-DiTC wherein "DiTC" is a dithiocarbamate group of the formula $R^5R^6$N—C(S)—S—, wherein $R^5$ and $R^6$ as defined in Formulas I and II; $M^1$ to $M^\Omega$ are each polymerized monomer units derived from a radically (co)polymerizable monomer unit having an average degree of polymerization x, each x is independent, and Az is an azlactone group or a ring-opened azlactone group of Formula III. Further, the polymer product retains the dithiocarbamate functional group "DiTC" at one terminal end of the polymer necessary to initiate a further polymerization (or functionalization). The polymer product further comprises either the azlactone moiety or the ring-opened azlactone moiety of the photoiniferter at the other terminal end, which may be further reacted or functionalized as desired. Because the two terminal moieties have different functionality and reactivity, each terminus may be independently functionalized.

The terminal dithiocarbamate group may be functionalized independently from the terminal "Az" group. For example, functionalization of the azlactone followed by mild hydrolysis of the dithiocarbamate groups yields thiols, which readily oxidizes to form a dimeric polymer linked by a disulfide group. Reduction of the disulfide linkage to yield a thiol group, which then may be further functionalized. Further, it has been discovered that hydroxy-, amino- and thio-compounds add preferentially to the azlactone terminal group rather than the thiocarbamate terminal group, allowing independent functionalization.

The present invention encompasses a novel process for preparing random, block, multi-block, star, gradient, random hyperbranched and dendritic copolymers, as well as graft or "comb" copolymers. Each of these different types of copolymers will be described hereunder.

Since photoiniferter polymerization is a "living" or "controlled" polymerization, it can be initiated and terminated as desired. Thus, in one embodiment, once the first monomer is consumed in the initial polymerizing step, a second monomer can then be added to form a second block on the growing polymer chain in a second polymerizing step. Additional polymerizations with the same or different monomer(s) can be performed to prepare multi-block copolymers. Accelerants or thiurams may be added to control the polymerization of subsequent blocks as desired.

Because photoiniferter polymerization is radical polymerization, blocks can be prepared in essentially any order. One is not necessarily limited to preparing block copolymers where the sequential polymerizing steps must flow from the least stabilized polymer intermediate to the most stabilized polymer intermediate, such as is necessary in ionic polymerization. Thus, one can prepare a multi-block copolymer in which a polyacrylonitrile or a poly(meth)acrylate block is prepared first, then a styrene or butadiene block is attached thereto, etc.

Furthermore, a linking group is not necessary to join the different blocks of the present block copolymer. One can simply add successive monomers to form successive blocks. Further, it is also possible (and in some cases advantageous) to first isolate a (co)polymer produced by the present photoiniferter polymerization process, then react the polymer with an additional monomer using a thiuram or accelerant. In such a case, the product polymer having a terminal dithiocarbamate group acts as the new photoiniferter for the further polymerization of the additional monomer.

Since the novel photoiniferters provide a reactive group "Az" at a terminal end of the polymer, linking groups may be used to join two polymer blocks. For example, in one embodiment, a polymer prepared in accord with the present invention, and having an azlactone group at one terminus, may be reacted with a second polymer block having a nucleophilic terminal group.

Statistical copolymers may be produced using the photoiniferters of the present invention. Such copolymers may use 2 or more monomers in a range of about 0–100% by weight of each of the monomers used. The product copolymer will be a function of the molar amounts of the monomers used and the relative reactivity of the monomers.

The present invention also provides graft or "comb" copolymers. Here, a first (co)polymer having pendent nucleophilic functional groups, such as hydroxy-, amino- or thio-groups, etc. is provided. An example of useful (co)polymers include hydroxyethyl acrylate (co)polymers. Next, the reactive functional groups of the first (co)polymer is reacted with the azlactone photoiniferters of Formula I to provide a (co)polymer having pendent, ring-opened photoiniferter moieties, the reaction product having the structure of Formula II, where $R^7$ is the residue of the first (co)polymer. This product (co)polymer may then be used as an photoiniferter to polymerize the previously-described monomers to produce a comb (co)polymer. Alternatively, the first (co)polymer may be reacted with a telechelic (co)polymer of the invention, whereby the reactive "Az" terminal group reacts with the pendent reactive group of the first (co)polymer.

Gradient or tapered copolymers can be produced using photoiniferter polymerization by controlling the proportion of two or more monomers being added. For example, one can prepare a first block or an oligomer of a first monomer, then a mixture of the first monomer and a second distinct monomer can be added in proportions of from, for example, 1:1 to 9:1 of first monomer to second monomer. After conversion of all monomer(s) is complete, sequential additions of first monomer-second monomers mixtures can provide subsequent "blocks" in which the proportions of first monomer to second monomer vary. Thus, the invention provides copolymers obtained from two or more radically (co)polymerizable monomers wherein the copolymer has a composition that varies along the length of the polymer chain from azlactone terminus to opposite terminus based on the relative reactivity ratios of the monomers and instantaneous concentrations of the monomers during polymerization.

EXAMPLES

All reagents unless otherwise noted were purchased from Aldrich (Milwaukee, Wis.) and were used in their delivered condition. Polymerizable reagents were stripped of inhibitors prior to use by passing them through an alumina column (also supplied by Aldrich). Solvents were purchased from EM Science located in Gibbstown, N.J.

EXAMPLES

All solvents and reagents were obtained, or are obtainable, from Aldrich Chemical Co., Milwaukee, Wis. Compounds described in the Examples were found to have $^1$H NMR and IR spectra that were consistent with the assigned structure.

Preparative Example 1

Preparation of 2-(2-Chloro-acetylamino)-2-methyl propionic acid.

To a stirring mixture of 2-aminoisobutyric acid (165.8 g; 1.61 mol), sodium hydroxide (64.4 g; 1.61 mol) and 800 ml water cooled to 5° C., was added chloroacetyl chloride (200 g; 1.77 mol) and then a solution of sodium hydroxide (70.8 g; 1.77 mol) in 143 ml water. The temperature was maintained between 5 to 10° C. during the additions. The reaction mixture was then allowed to warm to room temperature and the solution was acidified with 165 ml of concentrated aqueous HCl. The precipitated solid was filtered and dried under vacuum to afford 180.4 g (62%) of product.

Preparative Example 2

Preparation of 2-Chloromethyl-4,4-dimethyl-4H-oxazol-5-one

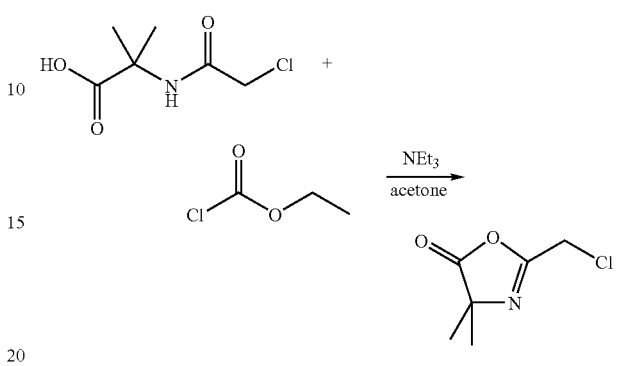

To a stirring mixture of 2-(2-chloro-acetylamino)-2-methyl propionic acid (18.0 g; 0.100 mol), triethylamine (11.1 g; 0.110 mol) and 100 ml of acetone in a round bottom flask, cooled with an ice bath, was added ethyl chloroformate (10.5 ml; 0.110 mol) over a period of 10 minutes. The reaction mixture was then allowed to warm to room temperature and was stirred for 2 hours. The mixture was then filtered, and the filtrate was concentrated under vacuum. Hexane (200 ml) was added to the residue, and the mixture was filtered. After removal of the solvent under vacuum, the filtrate residue was distilled under reduced pressure (59–60°; 7 mmHg) to give 13.2 g (82%) of a colorless oil.

Example 1

Preparation of Diethyl-dithiocarbamic acid 4,4-dimethyl-5-oxo-4,5-dihydro-oxazol-2-ylmethyl ester (AzDC)

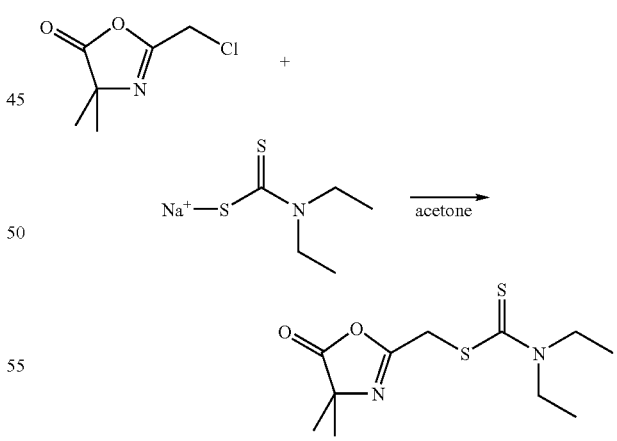

A mixture of 10 g of sodium diethyl dithiocarbamate trihydrate and 100 ml of toluene in a round bottom flask were boiled at reflux while water was separated and removed with a Dean-Stark trap. After 1 hour, the mixture was allowed to cool to room temperature and the toluene solution was concentrated under reduced pressure to afford 7.0 g of anhydrous diethyl dithiocarbamate as a pink solid, which was further dried in a vacuum oven.

To a solution of 6.00 g (0.037 mol) of 2-chloromethyl-4,4-dimethyl-4H-oxazol-5-one dissolved in 130 ml of acetonitrile was added 6.72 g (0.039 mol) of the anhydrous sodium diethyl dithiocarbamate. The mixture was stirred under a nitrogen atmosphere at room temperature for 2 hours. The reaction mixture was filtered, and the filtrate was concentrated under reduced pressure. The crude product was distilled under reduced pressure (170–180° C.; 0.25 mmHg) to afford 7.46 g (74%) of AzDC as a yellow-green oil.

Example 2

Preparation of Diethyl-dithiocarbamic acid {1-[2-(bis-{2-[2-(2-diethylthiocarbamoyl sulfanyl-acetylamino)-2-methyl-propionylamino]-ethyl}-amino)-ethylcarbamoyl]-1-methyl-ethylcarbamoyl}-methyl ester [tris(ring-opened AzDC)amine].

To a solution of 0.077 g (0.00053 mol) of tris(2-aminoethyl)amine in 10 ml of tetrahydrofuran was added 0.431 g (0.00157 mol) of the product of Example 1 (AzDC). The reaction was stirred at room temperature under a nitrogen atmosphere for 3 hours, after which time the solvent was removed under reduced pressure. The resultant product was dried overnight at 52° C. in a vacuum oven to afford 0.443 g (86%) of the tris(ring-opened AzDC)amine as a white powder.

Example 3

Synthesis of Az-PSt-DC via the Controlled Polymerization of Styrene with AzDC.

A solution of 0.120 g (0.00044 mol) of the product of Example 1 (AzDC, Ex. 1) in 40.0 g (0.384 mol) of styrene was prepared. The solution was divided into five equal 8.0 g portions, which were placed in screw-cap vials. Each vial was fitted with a screw cap that had an integral valve and rubber septum. The solutions were degassed by three successive freeze-pump-thaw cycles. The reaction vials were then placed on rollers under a UV lamp (10 cm from bulb; light intensity=1.25 mW, Sylvania F40/350BL-blacklight) and were irradiated. Each vial was irradiated for a different period of time (2.5, 6, 10, 16 and 20 hours, respectively) after which time the reaction vial was opened and three small aliquots of reaction mixture were removed. Each small aliquot of reaction mixture was weighed and was then concentrated to dryness in a vacuum oven. The ratio of the mass of each dried sample to the mass of the aliquot of reaction mixture was used to calculate the percent conversion of the monomer. The remaining material from each reaction vial was precipitated from methanol. The resulting precipitates were dried under high vacuum, dissolved in tetrahydrofuran and analyzed by gel permeation chromatography. The results are shown in Table 1.

TABLE 1

GPC results for the controlled polymerization of styrene with AzDC.

| Time (hours) | % Conversion | $M_n$ |
|---|---|---|
| 2.5 | 7.3 | 15500 |
| 6 | 16.4 | 17700 |
| 10 | 23.2 | 22300 |
| 16 | 32.7 | 27800 |
| 20 | 36.1 | 31000 |

Example 4

Synthesis of a Poly(Methyl Methacrylate) Star Polymer with Tris(ring-opened AzDC)amine.

A solution of 0.046 g (0.000047 mol) of the product of Example 2 (tris(ring-opened AzDC)amine) in 100 ml of benzene was prepared. To 40.0 g (0.400 mol) of methyl methacrylate in a round-bottomed flask was added 11.4 ml of the tris(ring-opened AzDC)amine benzene solution. This solution was divided into five equal 10.0 g portions, which were placed in screw-cap vials. Each vial was fitted with a screw cap that had an integral valve and rubber septum. The solutions were degassed by three successive freeze-pump-thaw cycles. The reaction vials were placed on rollers under a UV lamp (10 cm from bulb; light intensity=1.25 mW) and irradiated. Each vial was irradiated for a different period of time (1, 2, 4, 6 and 8 hours) after which time the reaction vial was opened and three small aliquots of reaction mixture were removed. Each small aliquot of reaction mixture was weighed and was then concentrated to dryness in a vacuum oven. The ratio of the mass of each dried sample to the mass of the aliquot of reaction mixture was used to calculate the percent conversion of the monomer. The remaining material from each reaction vial was dried under high vacuum, dissolved in tetrahydrofuran and analyzed by gel permeation chromatography. The results are shown in Table 2.

TABLE 2

GPC results for the controlled polymerization of methyl methacrylate with tris(ring-opened AzDC)amine.

| Time (hours) | % Conversion | $M_n$ |
|---|---|---|
| 1 | 1.2 | 183,000 |
| 2 | 6.5 | 249,000 |
| 4 | 12.2 | 297,000 |
| 6 | 15.1 | 304,000 |
| 8 | 20.3 | 324,000 |

Example 5

Synthesis of a Polystyrene Star Polymer with Az-PSt-DC and Tris(2-aminoethyl)amine.

A solution of 0.163 g (0.0011 mol) tris(2-aminoethyl)amine in 750 ml of benzene was prepared. In a reaction vessel, separately, a solution of 0.478 g (0.000024 mol) of the product of Example 3 (Az-PSt-DC; $M_n$=19,700; polydispersity=1.76) in 4.0 ml of benzene was prepared and to this solution was added 3.8 ml of the tris(2-aminoethyl)amine solution. The reaction vessel was capped and shook at room temperature for 18 hours. Analysis of the resulting material by gel permeation chromatography showed $M_n$=31,500 and polydispersity=2.47. The peak observed on the GPC chromatogram was bimodal.

Example 6

Synthesis of Az-(PSt-block-PMMA)-DC via the Controlled Polymerization of Methyl Methacrylate with Az-PSt-DC.

A solution of 0.956 g (0.000049 mol) of the product of Example 3 (Az-PSt-DC; Mn=19,700; polydispersity=1.76)) in 36.6 ml of benzene was prepared. To this solution was added 32.0 g (0.320 mol) of methyl methacrylate. This solution was divided into four equal 14.5 g portions, which were placed in screw-cap vials. Each vial was fitted with a screw cap that had an integral valve and rubber septum. The solutions were degassed by three successive freeze-pump-thaw cycles. The reaction vials were placed on rollers under a UV lamp (10 cm from bulb; light intensity=1.25 mW) and irradiated. The reaction vials were each irradiated for a different period of time (2, 3, 4 and 5 hours) after which time each reaction vial was opened and three small aliquots of reaction mixture were removed. Each small aliquot of reaction mixture was weighed and was then concentrated to dryness in a vacuum oven. The ratio of the mass of each dried sample to the mass of the aliquot of reaction mixture was used to calculate the percent conversion of the monomer. The remaining material from each reaction vial was analyzed by gel permeation chromatography. The results are shown in Table 3.

TABLE 3

GPC results for the controlled polymerization of methyl methacrylate with Az-PSt-DC.

| Time (hours) | % Conversion | $M_n$ |
|---|---|---|
| 2 | 3.8 | 28100 |
| 3 | 5.6 | 40700 |
| 4 | 7.9 | 48300 |
| 5 | 9.8 | 53000 |

Example 7

Synthesis of Az-poly(St-co-HEMA)-DC via the Controlled Polymerization of a Styrene/2-hydroxyethyl methacrylate Mixture with AzDC.

A mixture of 0.030 g (0.00011 mol) of AzDC, 0.497 g (0.0038 mol), 2-hydroxyethyl methacrylate (HEMA) and 9.98 g (0.096 mol) of styrene was prepared in a screw cap vial that was fitted with a cap that had an integral valve and rubber septum. The mixture degassed by three successive freeze-pump-thaw cycles. The reaction vial was then placed on rollers under a UV lamp (10 cm from bulb; light intensity=1.25 mW) and irradiated. The reaction mixture was irradiated for 16 hours. Upon completion of the irradiation, the resulting material was precipitated from petroleum ether. The resulting precipitate was dried under high vacuum, dissolved in tetrahydrofuran and analyzed by gel permeation chromatography. The resulting polymer had $M_n$=25,200 and polydispersity=1.97.

Example 8

Synthesis of a Branched Copolymer with Az-poly(St-co-HEMA)-DC.

The product of Example 7 (Az-(St-co-HEMA)-DC; 1.25 g; 0.000050 mol) was dissolved in 1.5 ml of tetrahydrofuran in a screw-cap vial. To this solution was added 7.5 μL (0.000050 mol) of 1,8-diazabicyclo[5.4.0]undec-7-ene (DBU). The vial was shaken at room temperature on a laboratory shaker for 18 hours. Analysis of the resulting material by gel permeation chromatography showed $M_n$=37,500 and polydispersity=4.05.

We claim:

1. A telechelic (co)polymer comprising polymerized units of one or more free radically (co)polymerizable monomers, an first ring-opened azlactone terminal group; and a second dithiocarbamate terminal group.

2. The copolymer of claim 1 comprising two or more blocks of units obtained from free radically (co)polymerizable monomers, wherein the block copolymer has an ring-opened azlactone residue at one terminal end and a dithiocarbamate group at the other terminal end.

3. The (co)polymer of claim 1 comprising polymerized units obtained from two or more radically (co)polymerizable monomers wherein the copolymer has a composition that varies along the length of the polymer chain from ring-opened azlactone terminus to opposite terminus based on the relative reactivity ratios of the monomers and instantaneous concentrations of the monomers during polymerization.

4. The (co)polymer of claim 1, wherein said (co)polymer comprises polymerized monomer units selected from the group consisting of (meth)acrylic acid and esters thereof; fumaric acid and esters thereof; itaconic acid and esters thereof; maleic anhydride; styrene; α-methyl styrene; vinyl halides; (meth)acrylonitrile, vinylidene halides; butadienes; unsaturated alkylsulphonic acids and esters and halides thereof; and (meth)acrylamides, and mixtures thereof; said (co)polymer having an azlactone residue at one end of the (co)polymer chain and a radically transferable group at the other end of the (co)polymer chain.

5. The (co)polymer of claim 1 having the structure Az-$(M^1)_x$-DiTC, wherein
DiTC is a dithiocarbamate of the formula $R^5R^6N$—C(S)—S, where $R^5$ and $R^6$ are each independently selected from an alkyl group, a cycloalkyl group, a heterocyclic group, an aryl group, an arenyl group, or $R^5$ and $R^6$ taken together with the nitrogen to which they are attached form a heterocyclic ring;
$M^1$ is a monomer unit derived from a radically (co)polymerizable monomer unit having an average degree of polymerization x, and
Az is a ring-opened azlactone group of the formula:

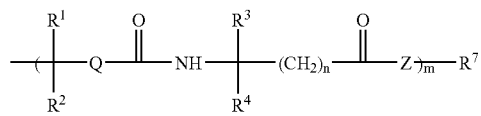

wherein $R^1$ and $R^2$ are each independently selected from H, an alkyl group, a nitrile, a cycloalkyl group, a heterocyclic group, an arenyl group and an aryl group, or $R^1$ and $R^2$ taken together with the carbon to which they are attached form a carbocyclic ring;
$R^3$ and $R^4$ are each independently selected from an alkyl group, a cycloalkyl group, an aryl group, a heterocyclic group, an arenyl group, or $R^3$ and $R^4$ taken together with the carbon to which they are attached form a carbocyclic ring;
$R^7$ is the residue of a mono- or polyfunctional compound of the formula $R^7(ZH)_m$;
Z is —O—, —S—, or —$NR^8$ wherein $R^8$ can be a H, an alkyl, a cycloalkyl or aryl, a heterocyclic group, an arenyl and m is at least one;
Q is a linking group selected from a covalent bond, (—$CH_2$—)$_o$, —CO—O—($CH_2$)$_o$—, —CO—O—($CH_2CH_2O$)$_o$—, —CO—$NR^6$—($CH_2$)$_o$—, —CO—S—($CH_2$)$_o$—, where o is 1 to 12, and $R^6$ is H, an alkyl group, a cycloalkyl group, an arenyl group, a heterocyclic group or an aryl group;
and n is 0 or 1.

6. The (co)polymer of claim 1 having the structure Az-$(M^1)_x(M^2)_x$-$(M^3)_x$ ... $(M^\Omega)_x$-DiTC, wherein DiTC is a dithiocarbamate of the formula $R^5R^6N-C(S)-S$, where $R^5$ and $R^6$ are each independently selected from an alkyl group, a cycloalkyl group, an aryl group, an arenyl group, or $R^5$ and $R^6$ taken together with the nitrogen to which they are attached form a heterocyclic ring;

$M^1$ to $M^\Omega$ are each polymer blocks of monomer units derived from a radically (co)polymerizable monomer units having an average degree of polymerization x, each x is independent, and Az is a ring-opened azlactone group of the formula:

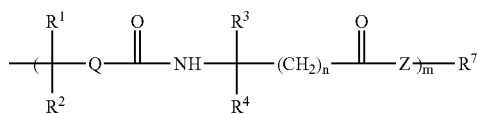

wherein $R^1$ and $R^2$ are each independently selected from H, an alkyl group, a nitrile, a cycloalkyl group, a heterocyclic group, an arenyl group and an aryl group, or $R^1$ and $R^2$ taken together with the carbon to which they are attached form a carbocyclic ring;

$R^3$ and $R^4$ are each independently selected from an alkyl group, a cycloalkyl group, an aryl group, an arenyl group, or $R^3$ and $R^4$ taken together with the carbon to which they are attached form a carbocyclic ring;

$R^7$ is the residue of a mono- or polyfunctional compound of the formula $R^7(ZH)_m$;

Z is $-O-$, $-S-$, or $-NR^8$ wherein $R^8$ can be a H, an alkyl, a cycloalkyl, an aryl group, a heterocyclic group, an arenyl and m is at least one;

Q is a linking group selected from a covalent bond, $(-CH_2-)_o$, $-CO-O-(CH_2)_o-$, $-CO-O-(CH_2CH_2O)_o-$, $-CO-NR^8-(CH_2)_o-$, $-CO-S-(CH_2)_o-$, where o is 1 to 12, and $R^8$ is H, an alkyl group, a cycloalkyl group, an arenyl group, a heterocyclic group or an aryl group; and, m is at least one and n is 0 or 1.

* * * * *

UNITED STATES PATENT AND TRADEMARK OFFICE
CERTIFICATE OF CORRECTION

PATENT NO.       : 7,041,755 B2                          Page 1 of 1
APPLICATION NO.  : 11/081197
DATED            : May 9, 2006
INVENTOR(S)      : Kevin M. Lewandowski It is certified that error appears in the above-identified patent and that said Letters Patent is hereby corrected as shown below:

Title Page, Col. 2, U.S. PATENT DOCUMENTS
Line 10, delete "B1" and insert -- B2 --, therefor.
Line 11, delete "B1" and insert -- B2 --, therefor.
Line 12, delete "B1" and insert -- B2 --, therefor.
Line 13, delete "B1" and insert -- B2 --, therefor.
Line 14, delete "B1" and insert -- B2 --, therefor.
Line 15, delete "B1" and insert -- B2 --, therefor.
Line 16, delete "B1" and insert -- B2 --, therefor.

Col. 9
Line 66, delete "-1, 4-diol," and insert -- -1,4-diol, --, therefor.

Col. 10
Lines 39-40, delete "2-mercaptoet-hykamine" and insert
-- 2-mercaptoethylamine --, therefor.

Col. 13
Line 53, delete "-DiTC)" and insert -- -DiTC, --, therefor.

Col. 16
Line 5, after "one" insert -- . --.
Line 39, after "(AzDC)" insert -- . --.

Col. 19
Line 47, delete "$M_{n=}25,200$" and insert -- $M_n = 25,200$ --, therefor.

Signed and Sealed this

Eighteenth Day of March, 2008

JON W. DUDAS
*Director of the United States Patent and Trademark Office*